Dec. 8, 1970 J. D. KENNELLY 3,546,669
FLASHING EMERGENCY SIGNAL LIGHT
Filed June 23, 1969
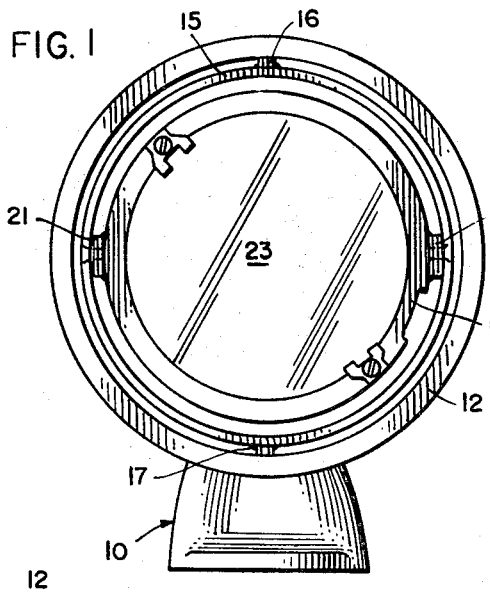
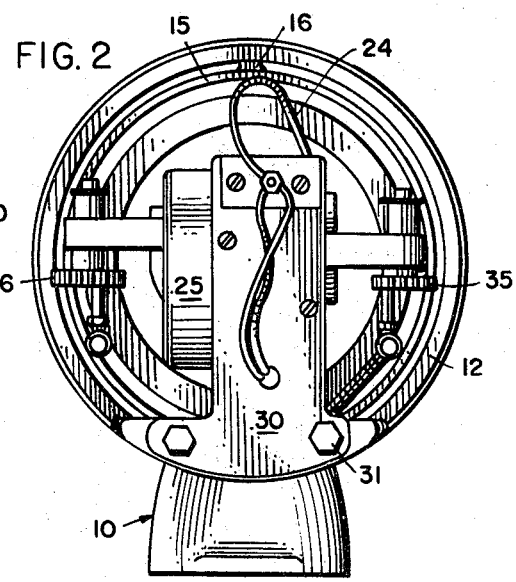
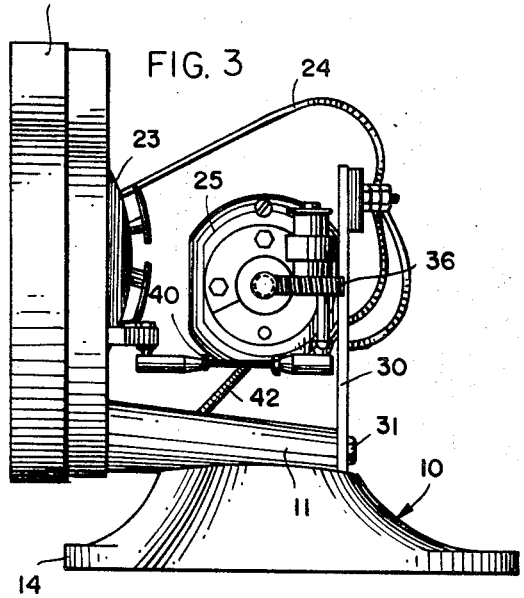
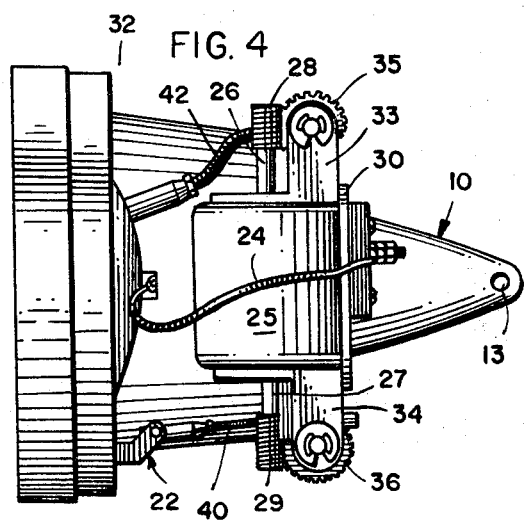
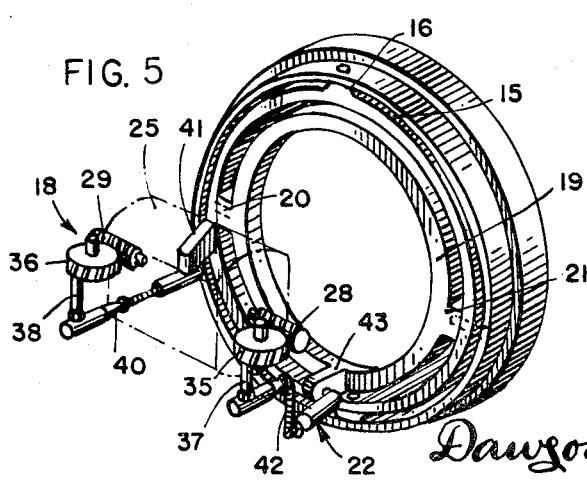
INVENTOR:
JEREMIAH D. KENNLLY
BY
Dawson, Tilton, Falloy & Lungmus
ATT'YS

United States Patent Office 3,546,669
Patented Dec. 8, 1970

3,546,669
FLASHING EMERGENCY SIGNAL LIGHT
Jeremiah D. Kennelly, Oak Park, Ill., assignor to Mars Signal Light Company, Bellwood, Ill., a corporation of Illinois
Filed June 23, 1969, Ser. No. 835,565
Int. Cl. B60q 1/26, 1/46
U.S. Cl. 340—84                                    4 Claims

ABSTRACT OF THE DISCLOSURE

An emergency signal light having a pair of trunnion-like ring mountings for a sealed beam lamp. A motor mounting is provided immediately behind the lamp with oppositely extending worms linked to the trunnion rings to develop a "figure 8" light pattern.

BACKGROUND AND SUMMARY OF THE INVENTION

I have found that mere oscillation of an emergency signal light is not the most effective means for warning people of the approach of an emergency vehicle such as a fire engine, a police car, etc. In my Pat. 2,510,892, an arrangement was provided for a "figure 8" light pattern and the instant invention constitutes an improvement thereover. In particular, the invention includes a structural arrangement wherein the various contributing forces needed for the oscillation are separated, yet compact, to provide a simple, yet rugged, and easily maintainable and repairable structure.

DETAILED DESCRIPTION

The invention is described in conjunction with an illustrative embodiment in the accompanying drawing, in which—

FIG. 1 is a front elevational view of the inventive light;
FIG. 2 is a rear elevational view of the light of FIG. 1 but with the protective housing removed;
FIG. 3 is a side elevational view of the showing in FIG. 2;
FIG. 4 is a top plan view of the showings in FIGS. 2 and 3; and
FIG. 5 is a fragmentary perspective view of the operational portions of the linkages for effecting the multi-sinusoidal movement provided in the inventive light.

In the illustration given and with particular reference to FIG. 1, the numeral 10 designates generally a base which is adapted for mounting atop the roof of an emergency vehicle or other prominent position for warning pedestrians and motorists of the approach of an emergency vehicle (not shown). Provided as part of the base 10 is a generally horizontal forwardly projecting platform 11 (see FIG. 3) which has integral therewith a generally circular mounting ring 12. The ring 12 is disposed in a generally vertical plane when the base 10 is bolted to a vehicle roof as by a bolt (not shown) extending through a bolt hole 13 (see FIG. 4). The base 10 also has a forwardly projecting ear portion 14 (see particularly FIG. 3) which accommodates a second bolt for securement.

A ring-like subframe 15 is trunnion mounted as at 16 and 17 within the ring-like frame 12. Thus, the outer subframe 15 is adapted to pivot about a generally vertical axis, with movement for this purpose being provided by a linkage mechanism generally designated 18 in FIG. 5.

An inner ring-like subframe 19 is trunnion-like mounted within the outer subframe 15 as at 20 and 21. This permits the inner subframe 19 to pivot about a generally horizontal axis under the influence of movement delivered thereto by a second linkage mechanism generally designated 22 in FIG. 5. The inner subframe 19 has mounted within it a sealed beam lamp 23 supplied with electrical current through a suitable conduit 24.

Providing the energy for oscillating the lamp 23 in the desired pattern is a motor 25 which is seen to include a pair of shaft extensions as at 26 and 27 (see particularly FIG. 4). Each shaft extension 26 and 27 is equipped with a worm as at 28 and 29, these being clearly seen in FIG. 5. The motor 25 is rigidly mounted on a generally vertically extending bracket 30 which is suitably bolted as at 31 to the platform 11. Thus, the entire working portion of the light is quite compact and readily enclosed in a suitable housing 32, a fragment of which is seen only in FIG. 4.

Each end of the motor 25 is equipped with a laterally projecting arm as at 33 and 34 (see FIG. 4). Rotatably mounted in each arm 33 and 34, respectively, is a worm gear 35 and 36 with the respective gears being in engagement with the worms 28 and 29.

As can be best appreciated from FIG. 5, each worm gear 35 and 36 is equipped with a depending spindle or rod, a rod 37 being provided on the gear 35 and a rod 38 being provided on the worm gear 36. The linkage generally designated 18 further includes a linkage member 40 (still referring to FIG. 5) which extends between the rod 38 and a rearwardly projecting lug 41 on the outer subframe 15. A linkage member 40 is essentially straight and develops a sinusoidal left-to-right movement of the lamp 23.

The linkage 22 also seen in FIG. 5 differs from the linkage 18 in having a stepped or offset type of member 42. The linkage member 42 is seen to extend between the rod 37 and a rearwardly extending lug or ear 43 provided on the inner subframe 19. By the arrangement shown, I am able to provide linkage connection to the two subframes which are spaced approximately 90° apart so as to power the two subframes properly, yet the power train is essentialy compact with the motor 25 being positioned almost centrally behind the lamp 23 and in close relation thereto. Also, the separation of the two linkage systems or power trains make possible ready maintenance as, for example, lubrication of the various pivotal interconnections between the rod 37 and the ear 43.

In the illustration given, I employ gearing of different capacity at 18 and 22. For example, with gearing at 18 providing only one-sixth the speed of the gearing at 22 I am able to complete three figure-eights during one cycle, i.e., the inner subframe 19 with go through 3 cycles while the outer subframe 15 goes through one-half an oscillation. This makes possible a startlingly effective signal light.

I claim:
1. An emergency signal light comprising a base providing a light mounting frame, outer and inner subframes pivotally mounted on said frame for respective pivotal movement about perpendicular axes, a sealed beam lamp mounted within said inner subframe, said base also providing motor means spaced from said frame including a motor casing with a shaft extending out of opposite ends of said casing, each shaft extension including a worm, a worm gear rotatably mounted on said motor means for each worm and in engagement therewith, and a connecting link between one worm gear and the outer subframe and a second connecting link between the other worm gear and the inner subframe.
2. The structure of claim 1 in which said other subframe is trunnion mounted in said frame for pivoting about a generally vertically axis, said inner subframe being trunnion mounted within said outer subframe for pivoting about a generally horizontal axis, the outer subframe connecting link being generally straight while the inner subframe connecting link is equipped with an intermediate stepped portion to provide a compact signal light.

3. The structure of claim 2 in which said motor means includes a generally flat bracket extending generally vertically upwardly from said base, said frame being a ring disposed in a generally vertical plane, said casing on said bracket between said bracket and said ring being equipped with supporting arms projecting laterally from said casing for supporting said gear.

4. The structure of claim 1 in which the pitch on one worm is different from the pitch on the other worm to provide a figure-eight type pattern of lamp movement.

References Cited

UNITED STATES PATENTS 2,814,029   11/1957   McRea _____ 340—87

HAROLD I. PITTS, Primary Examiner

U.S. Cl. X.R.

340—50, 84, 88